US006275798B1

(12) United States Patent
Johansson et al.

(10) Patent No.: US 6,275,798 B1
(45) Date of Patent: Aug. 14, 2001

(54) SPEECH CODING WITH IMPROVED BACKGROUND NOISE REPRODUCTION

(75) Inventors: Ingemar Johansson; Jonas Svedberg; Anders Uvliden, all of Luleå (SE)

(73) Assignee: Telefonaktiebolaget L M Ericsson, Stockholm (SE)

(*) Notice: Subject to any disclaimer, the term of this patent is extended or adjusted under 35 U.S.C. 154(b) by 0 days.

(21) Appl. No.: 09/154,361

(22) Filed: Sep. 16, 1998

(51) Int. Cl.[7] ..................................................... G10L 15/20
(52) U.S. Cl. ........................... 704/233; 704/231; 704/225
(58) Field of Search ............................ 704/233, 225–228

(56) References Cited

U.S. PATENT DOCUMENTS 4,630,305 * 12/1986 Borth et al. .......................... 704/226
4,969,192 11/1990 Chen et al. ............................ 381/31
5,008,941 * 4/1991 Sejnoha ................................ 704/221
5,012,519 * 4/1991 Adlersberg et al. ................. 704/201
5,148,489 * 9/1992 Erell et al. ........................... 704/226
5,179,626 * 1/1993 Thomson ............................. 704/201
5,233,660 * 8/1993 Chen .................................... 704/219
5,615,298 * 3/1997 Chen .................................... 704/201

FOREIGN PATENT DOCUMENTS 0786760 7/1997 (EP) ................................ G10L/3/00
0843301 5/1998 (EP) ................................ G10L/3/02
9634382 10/1996 (WO) .............................. G10L/3/00

OTHER PUBLICATIONS

Proceedings of the 1998 IEEE International Conference on Acoustics, Speech and Signal Processing, ICASSP '98, Seattle, WA, vol. 1., May 1998, pp. 365–368, "A Voice Activity Detector Employing Soft Decision Based Noise Spectrum Adaptation", J. Sohn et al., XP–002085126.
IEEE 1995, Ericsson Radio Systems AB, Stockholm Sweden "Improvements of Background Sound Coding in Linear Predictive Speech Coders", Torbjörn Wigren et al., pp. 25–28.

* cited by examiner

*Primary Examiner*—Fan Tsang
*Assistant Examiner*—Michael N. Opsasnick
(74) *Attorney, Agent, or Firm*—Jenkens & Gilchrist, P.C.

(57) ABSTRACT

In producing an approximation of an original speech signal from encoded information about the original speech signal, current parameters associated with a current segment of the original speech signal are determined from the encoded information. Reproduction of a noise component of the original speech signal is improved by using at least one of the current parameters and corresponding previous parameters respectively associated with previous segments of the original speech signal to produce a modified parameter. The modified parameter is then used to produce an approximation of the current segment of the original speech signal.

31 Claims, 4 Drawing Sheets

SPEECH CODING WITH IMPROVED BACKGROUND NOISE REPRODUCTION

FIELD OF THE INVENTION

The invention relates generally to speech coding and, more particularly, to the reproduction of background noise in speech coding.

BACKGROUND OF THE INVENTION

In linear predictive type speech coders such as Code Excited Linear Prediction (CELP) speech coders, the incoming original speech signal is typically divided into blocks called frames. A typical frame length is 20 milliseconds or 160 samples, which frame length is commonly used in, for example, conventional telephony bandwidth cellular applications. The frames are typically divided further into subframes, which subframes often have a length of 5 milliseconds or 40 samples.

In conventional speech coders such as mentioned above, parameters describing the vocal tract, pitch, and other features are extracted from the original speech signal during the speech encoding process. Parameters that vary slowly are computed on a frame-by-frame basis. Examples of such slowly varying parameters include the so called short term predictor (STP) parameters that describe the vocal tract. The STP parameters define the filter coefficients of the synthesis filter in linear predictive speech coders. Parameters that vary more rapidly, for example, the pitch, and the innovation shape and innovation gain parameters are typically computed for every subframe.

After the parameters have been computed, they are then quantized. The STP parameters are often transformed to a representation more suitable for quantization such as a line spectrum frequency (LSF) representation. The transformation of STP parameters into LSF representation is well known in the art.

Once the parameters have been quantized, error control coding and checksum information is added prior to interleaving and modulation of the parameter information. The parameter information is then transmitted across a communication channel to a receiver wherein a speech decoder performs basically the opposite of the above-described speech encoding procedure in order to synthesize a speech signal which resembles closely the original speech signal. In the speech decoder, postfiltering is commonly applied to the synthesized speech signal to enhance the perceived quality of the signal.

Speech coders which use linear predictive models such as the CELP model are typically very carefully adapted to the coding of speech, so the synthesis or reproduction of non-speech signals such as background noise is often poor in such coders. Under poor channel conditions, for example when the quantized parameter information is distorted by channel errors, the reproduction of background noise deteriorates even more. Even under clean channel conditions, background noise is often perceived by the listener at the receiver as a fluctuating and unsteady noise. In CELP coders, the reason for this problem is mainly the mean squared error (MSE) criterion conventionally used in the analysis-by-synthesis loop in combination with bad correlation between the target and synthesized signals. Under poor channel conditions, the problem is, as mentioned, even worse, because the level of the background noise fluctuates greatly. This is perceived by the listener as very annoying because the background noise level is expected to vary quite slowly.

One solution for improving the perceived quality of background noise in both clean and noisy channel conditions could include the use of voice activity detectors (VADs) which make a hard (e.g., yes or no) decision regarding whether the signal that is being coded is speech or non-speech. Based on the hard decision, different processing techniques can be applied in the decoder. For example, if the decision is non-speech, then the decoder can assume that the signal is background noise, and can operate to smooth out the spectral variations in the background noise. However, this hard decision technique disadvantageously permits the listener to hear the decoder switch between speech processing actions and non-speech processing actions.

In addition to the aforementioned problems, the reproduction of background noise is degraded even more at lowered bit rates (for example, below 8 kb/s). Under bad channel conditions at lowered bit rates, the background noise is often heard as a fluttering effect caused by unnatural variations in the level of the decoded background noise.

It is therefore desirable to provide for reproduction of background noise in a linear predictive speech decoder such as a CELP decoder, while avoiding the aforementioned undesirable listener perceptions of the background noise.

The present invention provides improved reproduction of background noise. The decoder is capable of gradually (or softly) increasing or decreasing the application of energy contour smoothing to the signal that is being reconstructed. Thus, the problem of background noise reproduction can be addressed by smoothing the energy contour without the disadvantage of a perceptible activation/deactivation of the energy contour smoothing operations.

DETAILED DESCRIPTION

Figure 1:
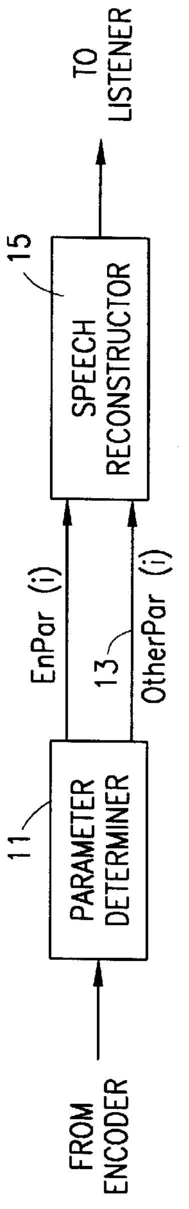
FIG. 1 (PRIOR ART)
FIG. 1 illustrates pertinent portions of a conventional linear predictive speech decoder.

Example FIG. 1 illustrates diagrammatically pertinent portions of a conventional linear predictive speech decoder, such as a CELP decoder, which will facilitate understanding of the present invention. In the conventional decoder portion of FIG. 1, a parameter determiner 11 receives from a speech encoder (via a conventional communication channel which is not shown) information indicative of the parameters which will be used by the decoder to reconstruct as closely as possible the original speech signal. The parameter determiner 11 determines, from the encoder information, energy parameters and other parameters for the current subframe or frame. The energy parameters are designated as EnPar(i) in FIG. 1, and the other parameters (indicated at 13) are designated as OtherPar(i), i being the subframe (or frame) index of the current subframe (or frame). The parameters are input to a speech reconstructor 15 which synthesizes or reconstructs an approximation of the original speech, and background noise, from the energy parameters and the other parameters.

Conventional examples of the energy parameters EnPar(i) include the conventional fixed codebook gain used in the CELP model, the long term predictor gain, and the frame energy parameter. Conventional examples of the other parameters Otherpar(i) include the aforementioned LSF representation of the STP parameters. The energy parameters and other parameters input to the speech reconstructor 15 of FIG. 1 are well known to workers in the art.

Figure 2:
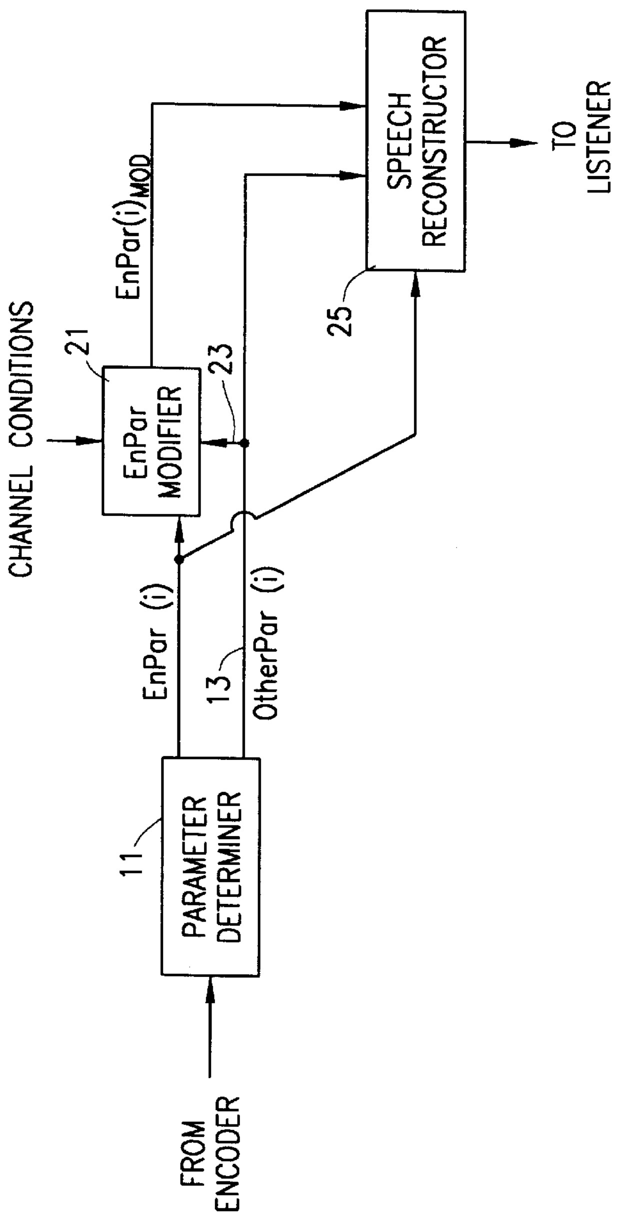
FIG. 2 illustrates pertinent portions of a linear predictive speech decoder according to the present invention.

FIG. 2 illustrates diagrammatically pertinent portions of an exemplary linear predictive decoder, such as a CELP decoder, according to the present invention. The decoder of FIG. 2 includes the conventional parameter determiner 11 of FIG. 1, and a speech reconstructor 25. However, the energy parameters EnPar(i) output from the parameter determiner 11 in FIG. 2 are input to an energy parameter modifier 21 which in turn outputs modified energy parameters En Par $(i)_{mod}$. The modified energy parameters are input to the speech reconstructor 25 along with the parameters EnPar(i) and OtherPar(i) produced by the parameter determiner 11.

The energy parameter modifier 21 receives a control input 23 from the other parameters output by the parameter determiner 11, and also receives a control input indicative of the channel conditions. Responsive to these control inputs, the energy parameter modifier selectively modifies the energy parameters EnPar(i) and outputs the modified energy parameters $\text{EnPar}(i)_{mod}$. The modified energy parameters provide for improved reproduction of background noise without the aforementioned disadvantageous listener perceptions associated with the reproduction of background noise in conventional decoders such as illustrated in FIG. 1.

In one example implementation of the present invention, the energy parameter modifier 21 attempts to smooth the energy contour in stationary background noise only. Stationary background noise means essentially constant background noise such as the background noise that is present when using a cellular telephone while riding in a moving automobile. In one example implementation, the present invention utilizes current and previous short term synthesis filter coefficients (the STP parameters) to obtain a measure of the stationarity of the signal. These parameters are typically well protected against channel errors. One example measure of stationarity using current and previous short term filter coefficients is given as follows:

$$diff = \sum_j |lsfAver_j - lsf_j| / lsfAver_j \quad \text{(Eq. 1)}$$

In Equation 1 above, $\text{lsf}_j$ represents the jth line spectrum frequency coefficient in the line spectrum frequency representation of the short term filter coefficients associated with the current subframe. Also in Equation 1, $\text{lsfAver}_j$ represents the average of the lsf representations of the jth short term filter coefficient from the previous N frames, where N may for example be set to 8. Thus, the calculation to the right of the summation sign in Equation 1 is performed for each of the line spectrum frequency representations of the short term filter coefficients. As one example, there are typically ten short term filter coefficients (corresponding to a 10th order synthesis filter) and thus ten corresponding line spectrum frequency representations, so j would index the lsf's from one to ten. In this example, for each subframe, ten values (one for each short term filter coefficient) will be calculated in Equation 1, and these ten values will then be summed together to provide the stationarity measure, diff, for that subframe.

Note that Equation 1 is applied on a subframe basis even though the short term filter coefficients and corresponding line spectrum frequency representations are updated only once per frame. This is possible because conventional decoders interpolate values of each line spectrum frequency lsf for each subframe. Thus, in conventional CELP decoding operations, each subframe has assigned thereto a set of interpolated lsf values. Using the aforementioned example, each subframe would have assigned thereto ten interpolated lsf values.

The $\text{lsfAver}_j$ term in Equation 1 can, but need not, account for the subframe interpolation of the lsf values. For example, the $\text{lsfAver}_j$ term could represent either an average of N previous lsf values, one for each of N previous frames, or an average of 4N previous lsf values, one for each of the four subframes (using interpolated lsf values) of each of the N previous frames. In Equation 1, the span of the lsf's can typically be 0–π, where π is half the sampling frequency.

One alternative way to compute the $\text{lsfAver}_j$ term of Equation 1 is as follows;

$$\text{lsfAver}_j(i) = A1 \cdot \text{lsfAver}_j(i-1) + A2 \cdot \text{lsf}_j(i) \quad \text{(Eq. 1A)}$$

where the $\text{lsfAver}_j(i)$ and $\text{lsfAver}_j(i-1)$ terms respectively correspond to the jth lsf representations of the ith and (i−1)th frames, and $\text{lsf}_j(i)$ is the jth lsf representation of the ith frame. For the first frame, when i=1, an appropriate (e.g., an empirically determined) initial value can be selected for the lsfAverj (i−1) (=$\text{lsfAver}_j(0)$) term. Example values of A1 and A2 include A1=0.84 and A2=0.16. Equation 1A above is computationally less complex than the exemplary 8-frame running average described above.

In an alternative formulation of the stationarity measure of Equation 1, the $\text{lsfAver}_j$ term in the denominator can be replaced by $\text{lsf}_j$.

The stationarity measure, diff, of Equation 1 indicates how much the spectrum for the current subframe differs from the average spectrum as averaged over a predetermined number of previous frames. A difference in spectral shape is very strongly correlated to a strong change in signal energy, for example the beginning of a talk spurt, the slamming of doors, etc. For most types of background noise, diff is very low, whereas diff is quite high for voiced speech.

Figure 6:
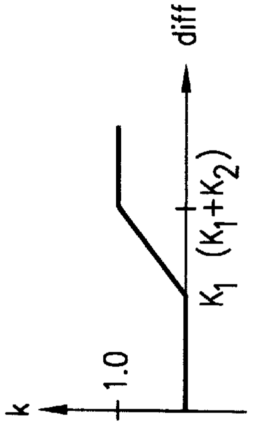
FIG. 6 illustrates graphically a relationship between a mix factor and a stationarity measure according to the invention.

For signals that are difficult to encode, such as background noise, it is preferable to ensure a smooth energy contour rather than exact waveform matching, which is difficult to achieve. The stationarity measure, diff, is used to determine how much energy contour smoothing is needed. The energy contour smoothing should be softly introduced or removed from the decoder processing in order to avoid audibly perceptible activation/deactivation of the smoothing operations. Accordingly, the diff measure is used to define a mix factor k, an example formulation of which is given by:

$$k = \min(K_2, \max(0, diff - K_1))/K_2 \quad \text{(Eq. 2)}$$

where $K_1$, and $K_2$ are selected such that the mix factor k is mostly equal to one (no energy contour smoothing) for voiced speech and zero (all energy contour smoothing) for stationary background noise. Examples of suitable values for $K_1$ and $K_2$ are $K_1=0.40$ and $K_2=0.25$. FIG. 6 illustrates graphically the relationship between the stationarity measure, diff, and the mix factor k for the example given above where $K_1=0.40$ and $K_2=0.25$. The mix factor k can be formulated as any other suitable function F of the diff measure, k=F(diff).

The energy parameter modifier 21 of FIG. 2 also uses energy parameters associated with previous subframes to produce the modified energy parameters $EnPar(i)_{mod}$. For example, modifier 21 can compute a time averaged version of the conventional received energy parameters EnPar(i) of FIG. 2. The time averaged version can be calculated, for example, as follows;

$$EnPar(i)_{avg} = \sum_{m=0}^{M-1} b_i EnPar(i-m) \qquad \text{(Eq. 3)}$$

where $b_i$ is used to make a weighted sum of the energy parameters. For example, the value of $b_i$, may be set to 1/M to provide a true averaging of the energy parameter values from the past M subframes. The averaging of Equation 3 need not be performed on a subframe basis, and could also be performed on M frames. The basis of the averaging will depend on the energy parameter(s) being averaged and the type of processing that is desired.

Once the time averaged version of the energy parameter, $EnPar(i)_{avg}$, has been calculated using Equation 3, the mix factor k is used to control the soft or gradual switching between use of the received energy parameter value EnPar(i) and the averaged energy parameter value $EnPar(i)_{avg}$. One example equation for application of the mix factor k is as follows:

$$EnPar(i)_{mod} = k \cdot EnPar(i) + (1-k) \cdot EnPar(i)_{avg} \qquad \text{(Eq. 4)}$$

It is clear from Equation 4 that when k is low (stationary background noise) then mainly the averaged energy parameters are used, to smooth the energy contour.

On the other hand, when k is high, then mainly the current parameters are used. For intermediate values of k, a mix of the current parameters and the averaged parameters will be computed. Note also that the operations of Equations 3 and 4 can be applied to any desired energy parameter, to as many energy parameters as desired, and to any desired combination of energy parameters.

Referring now to the channel conditions input to the energy parameter modifier 21 of FIG. 2, such channel condition information is conventionally available in linear predictive decoders such as CELP decoders, for example in the form of channel decoding information and CRC checksums. For example, if there are no CRC checksum errors, then this indicates a good channel, but if there are too many CRC checksum errors within a given sequence of subframes, then this could indicate an internal state mismatch between the encoder and the decoder. Finally, if a given frame has a CRC checksum error, then this indicates that the frame is a bad frame. In the above-described case of a good channel, the energy parameter modifier can, for example, take a conservative approach, setting M equal to 4 or 5 in Equation 3. In the case of the aforementioned suspected encoder/decoder internal state mismatch, the energy parameter 21 of FIG. 2 can, for example, change the mix factor k by increasing the value of $K_1$ in Equation 2 from 0.4 to, for example, 0.55. As can be seen from Equation 4 and FIG. 6, the increase of the value of $K_1$, will cause the mix factor k to remain at zero (full smoothing) for a wider range of diff values, thus enhancing the influence of the time averaged energy parameter term $EnPar(i)_{avg}$ of Equation 4. If the channel condition information indicates a bad frame, then the energy parameter modifier 21 of FIG. 2 can, for example, both increase the $K_1$, value in Equation 2 and also increase the value of M in Equation 3.

Figure 3:
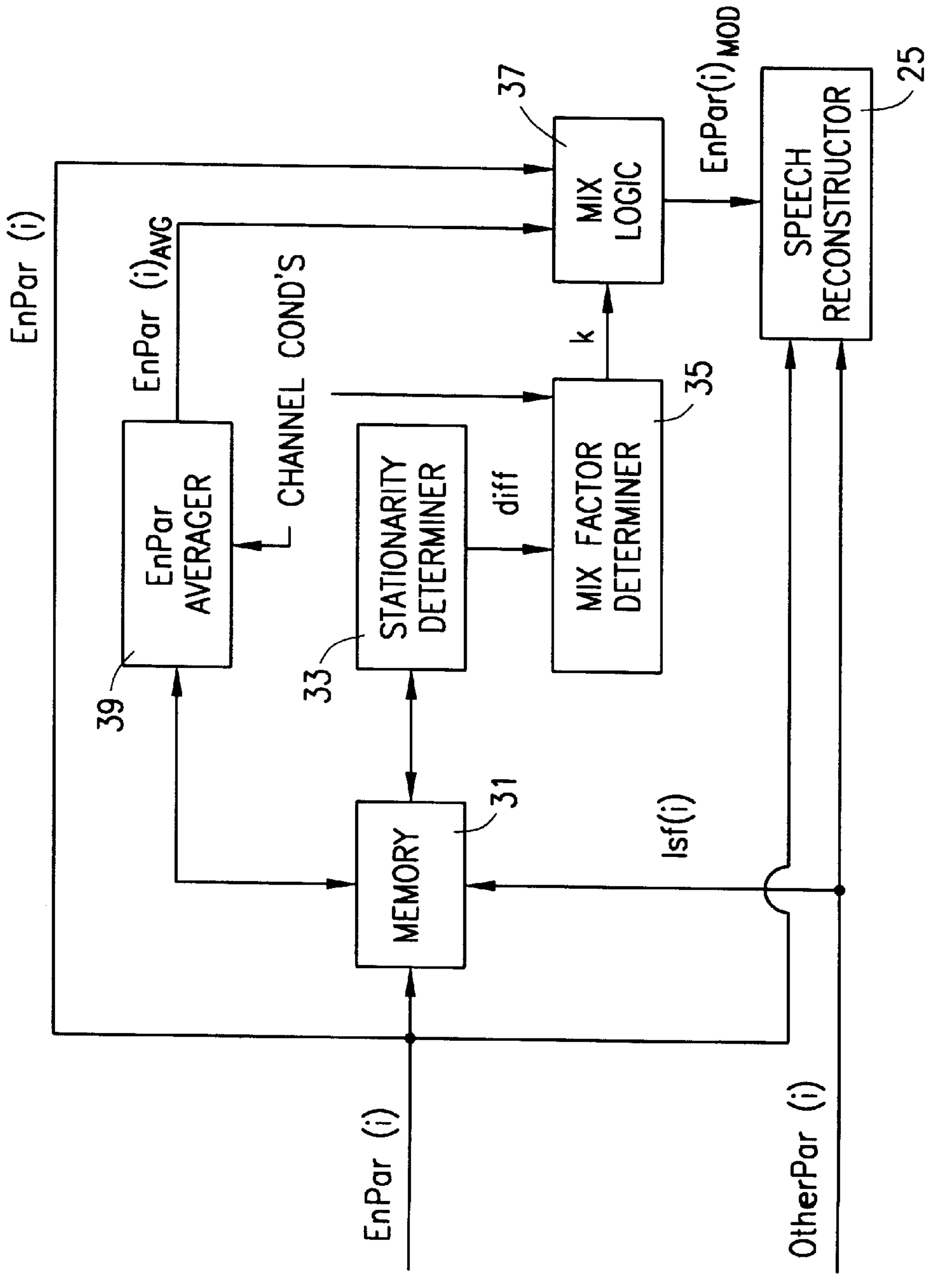
FIG. 3 illustrates in greater detail the modifier of FIG. 2.

FIG. 3 illustrates diagrammatically an example implementation of the energy parameter modifier 21 of FIG. 2. In the embodiment of FIG. 3, EnPar(i) and the lsf values of the current subframe, designated lsf(i), are received and stored in a memory 31. A stationarity determiner 33 obtains the current and previous lsf values from memory 31 and implements Equation 1 above to determine the stationarity measure, diff. The stationarity determiner then provides diff to a mix factor determiner 35 which implements Equation 2 above to determine the mix factor k. The mix factor determiner then provides the mix factor k to mix logic 37.

An energy parameter averager 39 obtains the current and previous values of EnPar(i) from memory 31 and implements Equation 3 above. The energy parameter averager then provides $EnPar(i)_{avg}$ to the mix logic 37, which also receives the current energy parameter EnPar(i). The mix logic 37 implements Equation 4 above to produce $EnPar(i)_{mod}$, which is then input to the speech reconstructor 25 along with the parameters EnPar(i) and OtherPar(i) as described above. The mix factor determiner 35 and the energy parameter averager 39 each receive the conventionally available channel condition information as a control input, and are operable to implement the appropriate actions, as described above, in response to the various channel conditions.

Figure 4:
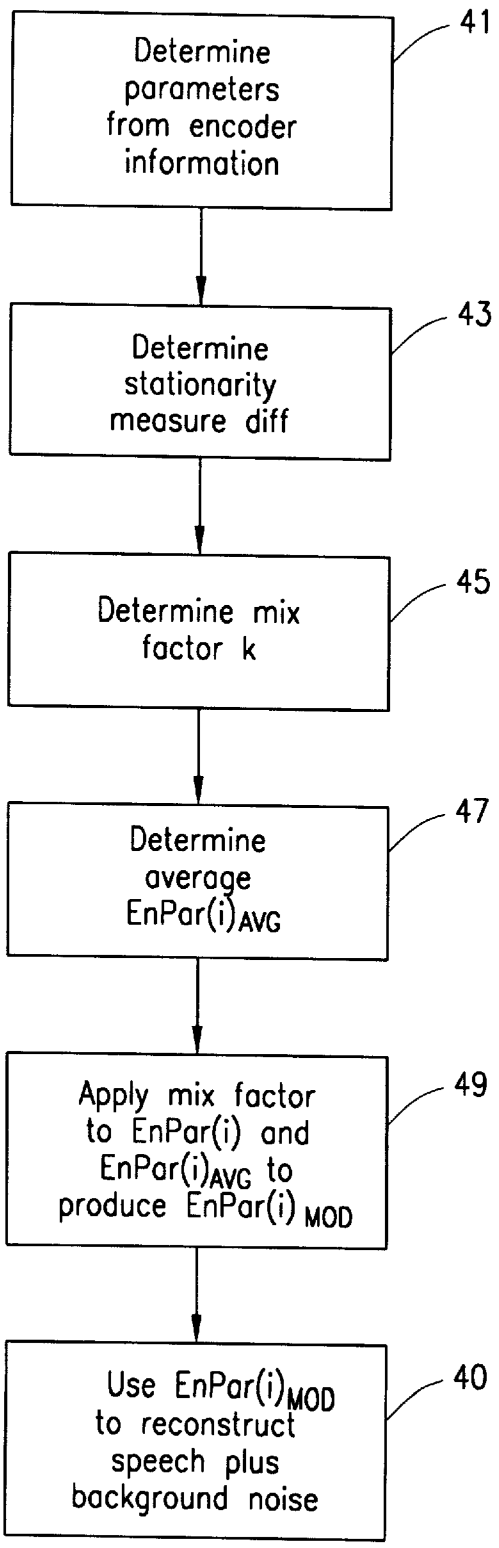
FIG. 4 illustrates in flow diagram format exemplary operations which can be performed by the speech decoder of FIGS. 2 and 3.

FIG. 4 illustrates exemplary operations of the exemplary linear predictive decoder apparatus illustrated in FIGS. 2 and 3. At 41, the parameter determiner 11 determines the speech parameters from the encoder information. Thereafter, at 43, the stationarity determiner 33 determines the stationarity measure of the background noise. At 45, the mix factor determiner 35 determines the mix factor k based on the stationarity measure and the channel condition information. At 47, the energy parameter averager 39 determines the time-averaged energy parameter $EnPar(i)_{avg}$. At 49, the mixing logic 37 applies the mix factor k to the current energy parameter(s) EnPar(i) and the averaged energy parameters $EnPar(i)_{avg}$ to determine the modified energy parameter(s) $EnPar(i)_{mod}$. At 40, the modified energy parameter(s) $EnPar(i)_{mod}$ is provided to the speech reconstructor along with the parameters EnPar(i) and OtherPar(i), and an approximation of the original speech, including background noise, is reconstructed from those parameters.

Figure 7:
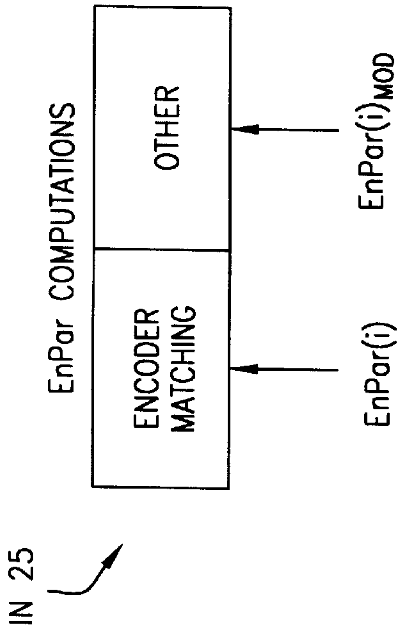
FIG. 7 illustrates in greater detail a portion of the speech reconstructor of FIGS. 2 and 3.

FIG. 7 illustrates an example implementation of a portion of the speech reconstructor 25 of FIGS. 2 and 3. FIG. 7 illustrates how the parameters EnPar(i) and $EnPar(i)_{mod}$ are used by speech reconstructor 25 in conventional computations involving energy parameters. The reconstructor 25 uses parameter(s) EnPar(i) for conventional energy parameter computations affecting any internal state of the decoder that should preferably match the corresponding internal state of the encoder, for example, pitch history. The reconstructor 25 uses the modified parameter(s) $EnPar(i)_{mod}$ for all other conventional energy parameter computations. By contrast, the conventional reconstructor 15 of FIG. 1 uses EnPar(i) for all of the conventional energy parameter computations illustrated in FIG. 7. The parameters OtherPar(i) (FIGS. 2 and 3) can be used in reconstructor 25 in the same way as they are conventionally used in conventional reconstructor 15.

Figure 5:
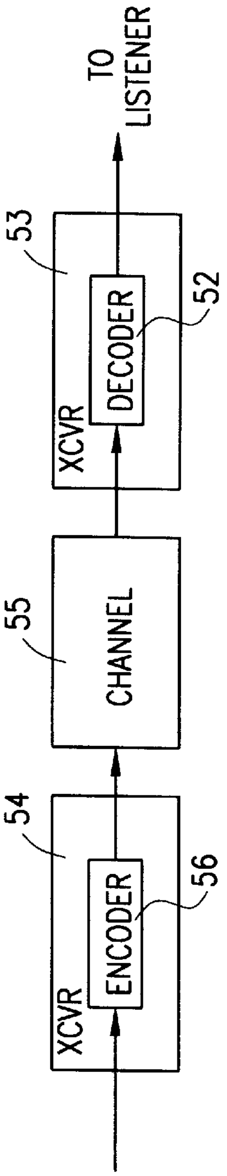
FIG. 5 illustrates a communication system according to the present invention.

FIG. 5 is a block diagram of an example communication system according to the present invention. In FIG. 5, a decoder 52 according to the present invention is provided in a transceiver (XCVR) 53 which communicates with a transceiver 54 via a communication channel 55. The decoder 52 receives the parameter information from an encoder 56 in the transceiver 54 via the channel 55, and provides reconstructed speech and background noise for a listener at the transceiver 53. As one example, the transceivers 53 and 54 of FIG. 5 could be cellular telephones, and the channel 55 could be a communication channel through a cellular telephone network. Other applications for the speech decoder 52 of the present invention are numerous and readily apparent.

It will be apparent to workers in the art that a speech decoder according to the invention can be readily implemented using, for example, a suitably programmed digital signal processor (DSP) or other data processing device, either alone or in combination with external support logic.

The above-described speech decoding according to the present invention improves the ability to reproduce background noise, both in error free conditions and bad channel conditions, yet without unacceptably degrading speech performance. The mix factor of the invention provides for smoothly activating or deactivating the energy smoothing operations so there is no perceptible degradation in the reproduced speech signal due to activating/deactivating the energy smoothing operations.

Also, because the amount of previous parameter information utilized in the energy smoothing operations is relatively small, this produces little risk of degrading the reproduced speech signal.

Although exemplary embodiments of the present invention have been described above in detail, this does not limit the scope of the invention, which can be practiced in a variety of embodiments.

What is claimed is:

1. A method of producing an approximation of an original speech signal from encoded information about the original speech signal, comprising:

determining from the encoded information a current parameter associated with a current segment of the original speech signal;

using the current parameter and corresponding previous parameters respectively associated with previous segments of the original speech signal to produce a modified parameter, including determining a mix factor indicative of the importance of the previous parameters relative to said current parameter in producing the modified parameter; and using the modified parameter to produce an approximation of the current segment of the original speech signal.

2. The method of claim 1, wherein the modified parameter differs from the current parameter.

3. The method of claim 1, wherein the current parameter is a parameter indicative of signal energy in the current segment of the original speech signal.

4. The method of claim 3, wherein said step of using current and previous parameters includes using the previous parameters in an averaging operation to produce an averaged parameter, and using the averaged parameter along with the current parameter to produce the modified parameter.

5. The method of claim 4, wherein said step of using the current and averaged parameters includes determining a mix factor indicative of the relative importance of the current parameter and the averaged parameter in producing the modified parameter.

6. The method of claim 5, wherein said step of determining a mix factor includes determining a stationarity measure indicative of a stationarity characteristic of a noise component associated with the current segment of the original speech signal, and determining the mix factor as a function of the stationarity measure.

7. The method of claim 6, wherein said step of determining a stationarity measure includes using at least another current parameter and corresponding previous parameters respectively associated with previous segments of the original speech signal to determine the stationarity measure.

8. The method of claim 7, wherein said last-mentioned step of using current and previous parameters includes applying an averaging operation to the previous parameters to produce an averaged parameter, and using the averaged parameter along with the current parameter to determine the stationarity measure.

9. The method of claim 7, wherein said at least another current parameter is a filter coefficient of a synthesis filter used in producing the approximation of the original speech signal.

10. The method of claim 5, wherein said step of using current and averaged parameters includes determining from the mix factor further factors respectively associated with the current and averaged parameters, and multiplying the current and averaged parameters by the respective further factors.

11. The method of claim 4, wherein said step of using the previous parameters in an averaging operation includes selectively changing the averaging operation in response to conditions of a communication channel used to provide the encoded information.

12. method of claim 1, wherein said step of determining a mix factor includes determining a stationarity measure indicative of a stationarity characteristic of a noise component associated with the current segment of the original speech signal, and determining the mix factor as a function of the stationarity measure.

13. The method of claim 1, wherein the step of determining a mix factor includes selectively changing the mix factor in response to conditions of a communication channel used to provide the encoded information.

14. The method of claim 3, wherein the current parameter is a fixed codebook gain for use in executing a Code Excited Linear Prediction speech decoding process.

15. speech decoding apparatus, comprising:

an input for receiving encoded information from which an approximation of an original speech signal is to be produced;

an output for outputting said approximation;

a parameter determiner coupled to said input for determining from the encoded information a current parameter to be used in producing an approximation of a current segment of the original speech signal;

a reconstructor coupled between said parameter determiner and said output for producing the approximation of the original speech signal;

a modifier coupled between said parameter determiner and said reconstructor for using said current parameter and corresponding previous parameters respectively associated with previous segments of the original speech signal to produce a modified parameter, said modifier includes a mix factor determiner for determining a mix factor indicative of the importance of the previous parameters relative to the current parameter in producing the modified parameter; and said modifier further for providing said modified parameter to said reconstructor for use in producing said approximation of the current segment of the original speech signal.

16. The apparatus of claim 15, wherein said modified parameter differs from said current parameter.

17. The apparatus of claim 15, wherein said current parameter is a parameter indicative of signal energy in the current segment of the original speech signal.

18. The apparatus of claim 17, wherein said modifier includes an averager for using the previous parameters in an averaging operation to produce an averaged parameter, said modifier operable to use the averaged parameter along with the current parameter to produce the modified parameter.

19. The apparatus of claim 18, wherein said mix factor determiner determines a mix factor indicative of the relative importance of the current parameter and the averaged parameter in producing the modified parameter.

20. The apparatus of claim 19, wherein said modifier includes a stationarity determiner coupled between said parameter determiner and said mix factor determiner for determining a stationarity measure indicative of a stationarity characteristic of a noise component of the current segment, said mix factor determiner operable to determine said mix factor as a function of said stationarity measure.

21. The apparatus of claim 20, wherein said stationarity determiner is operable to use at least another current parameter and corresponding previous parameters respectively associated with previous segments of the original speech signal to determine said stationarity measure.

22. The apparatus of claim 21, wherein said stationarity determiner is further operable to apply an averaging operation to said previous parameters corresponding to said at least another current parameter to produce a further averaged parameter, and to use said further averaged parameter along with said another current parameter to determine said stationarity measure.

23. The apparatus of claim 21, wherein said another current parameter is a filter coefficient of a synthesis filter implemented by said reconstructor in producing the approximation of the original speech signal.

24. The apparatus of claim 19, wherein said modifier includes mix logic coupled between said mix factor determiner and said reconstructor for determining from the mix factor further factors respectively associated with the current parameter and the averaged parameter, and for multiplying the current and averaged parameters by the respective further factors to produce respective products, said mix logic further operable to produce said modified parameter in response to said products.

25. The apparatus of claim 18, wherein said averager includes an input for receiving information indicative of conditions of a channel from which the encoded information is provided, said averager responsive to said information for selectively changing said averaging operation.

26. The apparatus of claim 15, wherein said modifier includes a stationarity determiner coupled between said parameter determiner and said mix factor determiner for determining a stationarity measure indicative of a stationarity characteristic of a noise component of the current segment, said mix factor determiner operable to determine said mix factor as a function of said stationarity measure.

27. The apparatus of claim 15, wherein said mix factor determiner includes an input for receiving information indicative of conditions of a channel from which the encoded information is provided, said mix factor determiner responsive to said information for selectively changing said mix factor.

28. The apparatus of claim 17, wherein said current parameter is a fixed codebook gain for use in a Code Excited Linear Prediction speech decoding process.

29. The apparatus of claim 15, wherein the speech decoding apparatus includes a Code Excited Linear Prediction speech decoder.

30. A transceiver apparatus for use in a communication system, comprising:

an input for receiving information from a transmitter via a communication channel;

an output for providing an output to a user of the transceiver;

a speech decoding apparatus having an input coupled to said transceiver input and having an output coupled to said transceiver output, said input of said speech decoding apparatus for receiving from said transceiver input encoded information from which an approximation of an original speech signal is to be produced, said output of said speech decoding apparatus for providing said approximation to said transceiver output; and said speech decoding apparatus further including a parameter determiner coupled to said input of said speech decoding apparatus for determining from said encoded information current parameters to be used in producing an approximation of a current segment of the original speech signal, a reconstructor coupled between said parameter detector and said output of said speech decoding apparatus for producing the approximation of the original speech signal, and a modifier coupled between said parameter detector and said reconstructor for using at least one of the current parameters and corresponding previous parameters respectively associated with previous segments of the original speech signal to produce a modified parameter, said modifier includes a mix factor determiner for determining a mix factor indicative of the importance of the previous parameters relative to the current parameter in producing the modified parameter, said modifier further providing the modified parameter to the reconstructor for use in producing said approximation of the current segment of the original speech signal.

31. The apparatus of claim 30, wherein said transceiver apparatus forms a portion of a cellular telephone.

* * * * *